May 4, 1948.

C. HOLLERITH 2,440,858

COMBINATION CAST AND STAMPED WHEEL

Filed March 17, 1944

Inventor

CHARLES HOLLERITH

By Beaman & Langford
Attorneys

Patented May 4, 1948

2,440,858

UNITED STATES PATENT OFFICE 2,440,858

COMBINATION CAST AND STAMPED WHEEL

Charles Hollerith, Jackson, Mich., assignor, by mesne assignments, to The B. F. Goodrich Company, Akron, Ohio, a corporation of New York Application March 17, 1944, Serial No. 526,870

3 Claims. (301—62)

The present invention relates to improvements in wheel construction, having particular reference to wheels suitable for use on aircraft.

One of the objects of the present invention is to provide an improved wheel construction for aircraft of a wide base rim type, which is economical to manufacture, sufficiently light in weight, and capable of meeting aircraft specifications.

Another object of the invention is to provide an improved wheel construction of the type described, having sheet metal stampings and cast or forged parts combined into a unitary structure.

A further object of the present invention is to provide a wheel structure of sheet metal stampings associated into a unitary structure and capable of being parted to facilitate mounting and demounting of pneumatic tires.

Further objects and advantages are to be found in the arrangement, combination and construction of parts which constitute the wheel structure as will more fully appear from the specification and claims that follow.

Figure 1:
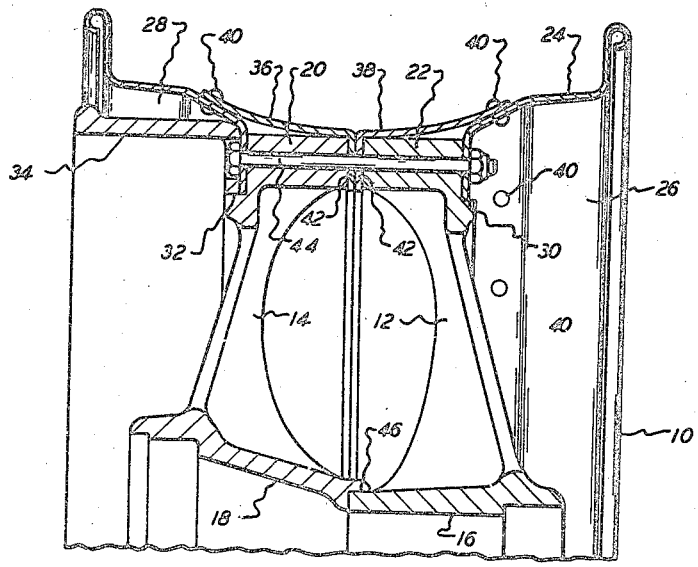
Figure 2:
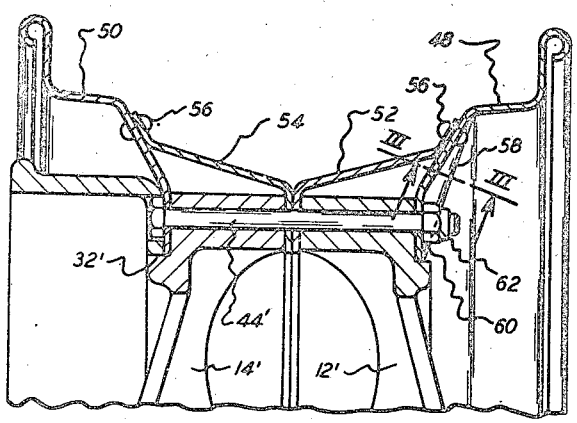
Figure 3:
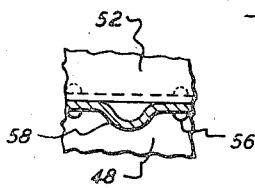

In the accompanying drawings,

Fig. 1 is a fragmentary cross-sectional view through a wheel constructed according to the principles of the present invention, showing the use of sheet metal stampings and cast construction parted along the center lines for mounting and demounting the tire, and Fig. 2 is a view similar to Fig. 1 of a slightly modified form, in which the general principles of construction of Fig. 1 have been adapted to a drop center type of rim, and Fig. 3 is a fragmentary cross-sectional view taken on line III—III of Fig. 2.

In the drawings, referring to Fig. 1, the wheel 10 comprises two cast sections 12 and 14 defining the hub portions 16 and 18, and peripheral portions 20 and 22 which carry the rim 24.

The rim 24 is preferably fabricated from sheet metal stampings 26 and 28, which are piloted on the annular ledges 30 and 32, the latter also functioning as a pilot for the brake drum 34. Reinforcing the rim structure are sheet metal stampings 36 and 38 which are riveted at 40. Each stamping 36 and 38 has a radially inturned flange 42 which spaces the peripheral portions 20 and 22. The circumferentially spaced bolts 44 clamp the wheel sections together and at the same time permit the wheel to be divided along its center line to facilitate mounting and demounting of the pneumatic tire. It will be noted that the hub portions 16 and 18 are piloted one upon the other as at 46.

Figs. 2 and 3 show a slightly altered form of the invention shown in Fig. 1, in that a drop center rim is provided by slightly altering the form of the stampings 48 and 50 as well as the stampings 52 and 54 riveted to the stampings 48 and 50 at 56. The bolts 44' hold the parts in assembled relation in the manner defined with reference to Fig. 1. Fig. 3 illustrates the manner in which a reinforcing web 58 is provided at circumferentially spaced points in which the holes 60 are provided to receive the bolts 44' and associated nut 62.

Having thus described my invention, what I desire to secure by Letters Patent and claim is:

1. A wheel structure comprising a two-part integral hub and rim supporting structure divided along a plane at right angles to the axis of rotation, a sheet metal rim likewise divided with each part having a pair of spaced radially inwardly extending flanges, and means for clamping said flanges to the outside and between said first parts.

2. A wheel structure as claimed in claim 1 wherein the outer flange of each rim part is piloted on an annular ledge formed around the outer periphery of its respective hub part.

3. A wheel structure as claimed in claim 1 wherein the inside flanges of the rim parts are provided upon separate sheet metal stampings which form the central portion of the sheet metal rim and are secured to separately formed outside stampings forming the wheel rim flanges of the sheet metal rim.

CHARLES HOLLERITH.

REFERENCES CITED

The following references are of record in the file of this patent:

UNITED STATES PATENTS

| Number | Name | Date |
|---|---|---|
| 1,954,757 | Maranville | Apr. 10, 1934 |
| 2,005,628 | Maranville | June 18, 1935 |
| 2,017,076 | Sauzedde | Oct. 15, 1935 |
| 2,048,442 | Frank | July 21, 1936 |
| 2,051,838 | Frank | Aug. 25, 1936 |
| 2,230,193 | Shinn | Jan. 28, 1941 |
| 2,272,962 | Tatter | Feb. 10, 1942 |

FOREIGN PATENTS

| Number | Country | Date |
|---|---|---|
| 172,546 | Switzerland | Oct. 15, 1934 |
| 577,266 | France | 1924 |